United States Patent [19]

Kim et al.

[11] Patent Number: 5,139,878
[45] Date of Patent: Aug. 18, 1992

[54] MULTILAYER FILM CONSTRUCTIONS

[75] Inventors: Hee-Teck Kim, Pottsville, Pa.;
Thomas C. Long, Morristown, N.J.

[73] Assignee: Allied-Signal Inc., Morristown, N.J.

[21] Appl. No.: 777,866

[22] Filed: Oct. 16, 1991

Related U.S. Application Data

[63] Continuation-in-part of Ser. No. 743,848, Aug. 12, 1991, abandoned.

[51] Int. Cl.$^5$ .............................................. B32B 27/00
[52] U.S. Cl. ..................................... 428/421; 428/483
[58] Field of Search ................ 428/483, 421, 354, 355

[56] References Cited

U.S. PATENT DOCUMENTS

| | | | |
|---|---|---|---|
| 2,953,551 | 9/1960 | White | 260/86.7 |
| 3,350,372 | 10/1967 | Aspon et al. | 260/86.7 |
| 3,480,580 | 11/1969 | Joyner et al. | 525/263 |
| 3,481,910 | 12/1969 | Joyner et al. | 525/285 |
| 3,612,155 | 10/1971 | Wong | 164/123 |
| 4,058,647 | 11/1977 | Inoue et al. | 428/474 |
| 4,444,826 | 4/1984 | Sasaki et al. | 428/216 |
| 4,659,625 | 4/1987 | Decroly et al. | 428/412 |
| 4,677,017 | 6/1987 | DeAntonis et al. | 428/214 |
| 4,754,270 | 6/1988 | Urawa et al. | 340/731 |

OTHER PUBLICATIONS

Modern Plastics Encyclopedia, vol. 57, No. 10A, pp. 345-348, McGraw Hill, Oct. 1980.
Technical Data Sheet for EMAC PE 2260 from Chevron Chemical Company.
Technical Data Sheet for Kodar PETG Copolyester 6763 from Eastman Kodak Company.
Technical Data Sheet for Selar PT from Du Pont Company.

*Primary Examiner*—Edith L. Buffalow
*Attorney, Agent, or Firm*—Michael U. Lee

[57] ABSTRACT

The present invention provides a multilayer film structure comprising at least one fluoropolymer film, at least one thermoplastic polymer film, and at least one adhesive layer selected from the group consisting of alkyl ester copolymers of an olefin and an $\alpha,\beta$-ethylenically unsaturated carboxylic acid, modified polyolefins comprising an olefin and a functional moiety selected from the group consisting of unsaturated polycarboxylic acids and acid anhydrides, and blends of the alkyl ester copolymers and the modified polyolefins, wherein the multilayer film exhibits high adhesion strength, and good moisture and gas barrier properties.

17 Claims, No Drawings

MULTILAYER FILM CONSTRUCTIONS

CROSS REFERENCE TO RELATED APPLICATION

This application is a continuation-in-part of application Ser. No. 743848, filed on Aug. 12, 1991, now abandoned.

BACKGROUND OF THE INVENTION

1. Field of the Invention

The present invention relates generally to multilayer film constructions. More particularly the present invention relates to high vapor and gas barrier multilayer film constructions comprising at least one fluoropolymer film, at least one thermoplastic polymer film, and an adhesive layer between each film.

2. Description of the Prior Art

A wide variety of thermoplastic resins are presently known, and films formed from such thermoplastic resins feature chemical and physical characteristics which are related to the thermoplastic resin from which they are formed. For the purposes of the present invention, the term film includes sheets as well as films, unless otherwise indicated.

Important physical characteristics of films which are of significant interest to the art include the barrier properties, including gas, aroma, and/or vapor such as water vapor, of the film as well as the physical characteristics, such as toughness, wear and weathering resistances, and light-transmittance. Such properties are especially important in the film applications wherein such properties are critical; one example of which includes the use of films as a packaging material for foodstuffs or medicaments.

Fluoropolymers are a class of paraffinic polymers that have some or all of the hydrogen replaced by fluorine, and they are known in the art for their inertness to most chemicals and resistance to high temperatures as well as low coefficients of friction. Most fluoropolymers, especially polychlorotrifluoroethylene (PCTFE) and ethylene-chlorotrifluoroethylene (ECTFE), exhibit excellent barrier properties, making them exceptionally good polymers as a barrier packaging material. However, such use of fluoropolymers is restricted to specialty packaging applications due to their relatively high cost.

A suitable means of reducing the cost of a packaging material fabricated from a costly polymer is to form multilayer structures in which the polymer film is laminated with other, less costly polymer films. This approach is particularly desirable for the fluoropolymer packaging applications since a thin layer of the fluoropolymer is often all that is needed to take advantage of the desirable properties of fluoropolymers while minimizing the cost. However, fluoropolymers do not adhere strongly to most other polymers; in fact, most fluoropolymers are known for their non-stick characteristics.

Various attempts have been made to produce such multilayer fluoropolymer film structures. One such film structure is described in U.S. Pat. No. 4,677,017 to DeAntonis et al. Such patent in particular discloses coextruded multilayer films which include at least one fluoropolymer film and at least one thermoplastic film which are joined by the use of an adhesive polymer, particularly ethylene/vinyl acetate resins, as an adhesive layer. U.S. Pat. No. 4,659,625 to Decroly et al. discloses a fluoropolymer multilayer film structure which utilizes a vinyl acetate polymer as an adhesive layer.

There remains a continuing need in the art for further improvements in fluoropolymer films and film structures, particularly those which provide a film structure featuring low water vapor and gas transmission, and good physical characteristics.

SUMMARY

In one aspect of the present invention there is provided a multilayer film structure which comprises at least one fluoropolymer layer, at least one thermoplastic polymer layer, and at least one adhesive layer comprising, based on the total weight of the adhesive layer, about 0 weight percent to about 90 weight percent of an alkyl ester copolymer of an olefin having about 2 to about 8 carbon atoms and an $\alpha,\beta$-ethylenically unsaturated carboxylic acid and about 100 weight percent to about 10 weight percent of a modified polyolefin comprising an olefin of about 2 to about 8 carbon atoms and a functional moiety selected from the group consisting of unsaturated carboxylic acids and acid anhydrides, wherein the adhesive layer composition is interposed between each polymer layer.

In a further aspect the present invention provides a multilayer film structure comprising at least one fluoropolymer film, at least one polyester layer, and at least one adhesive layer selected from the layer group consisting of alkyl ester copolymers of an olefin having about 2 to about 8 carbon atoms and an $\alpha,\beta$-ethylenically unsaturated carboxylic acid, modified polyolefins comprising an olefin of about 2 to about 8 carbon atoms and a functional moiety selected from the group consisting of unsaturated carboxylic acids and acid anhydrides, and blends of the alkyl ester copolymers and the modified polyolefins, wherein the adhesive layer composition is interposed between each polymer layer.

In another aspect the present invention provides molded or thermoformed articles from the multilayer film constructions described above.

DESCRIPTION OF THE PREFERRED EMBODIMENTS

As mentioned above, the multilayer film structure of the present invention comprises at least one fluoropolymer layer and at least one thermoplastic polymer layer, wherein an adhesive layer is interposed between each polymer layer. The multilayer film structure provides excellent gas and moisture barrier properties.

Fluoropolymers suitable to form a multilayer film of the present invention include, but are not limited to, ethylene-chlorotrifluoroethylene copolymer, ethylene-tetrafluoroethylene copolymer, fluorinated ethylene-propylene copolymer, perfluoroalkoxyethylene, polychlorotrifluoroethylene, polytetrafluoroethylene, polyvinylfluoride, polyvinylidene fluoride, and copolymers and blends thereof. For the purposes of the present invention, copolymers also include polymers having three or more monomer components as well as copolymers having two monomer components. Of these, particularly preferred fluoropolymers suitable to form multilayer barrier films of the present invention include homopolymers and copolymers of chlorotrifluoroethylene (CTFE), and copolymers of ethylene-chlorotrifluoroethylene (ECTFE). Such copolymers may contain up to 10% by weight of other comonomers such as vinylidine fluoride and tetrafluoroethylene. Most preferred are homopolymers of chlorotrifluoroethylene (CTFE), and copolymers of CTFE and vinylidine fluoride and/or tetrafluoroethylene for their exceptional gas and moisture barrier properties and outstanding transparency.

As the thermoplastic polymer layer, any thermoplastic film or thermoplastic film-forming polymer known to the art which features good strength in the final film product may be used. By way of non-limiting example, such films and polymers include: cellulosic polymers including cellulose acetate, cellulose triacetate, cellulose acetate butyrate, cellulose propionate, ethyl cellulose, cellophane; ionomers; polyamides including nylon 6, nylon 6,6, nylon 11 and nylon 12 as well as polyamide copolymers and blends thereof; polycarbonate; polyesters, including polyalkylene terephthalates, such as polybutylene terephthalate, polyethylene terephthalate, as well as polyester copolymers, particularly those copolymers comprising ethylene terephthalate with at least one additional comonomer, including cyclohexanedimethanol-modified polyethylene terephthalate (PETG); polyolefins, including polybutylene, polypropylene, polyethylenes including low density polyethylene, medium density polyethylene, high density polyethylene, ultrahigh molecular weight polyethylene, ethylene copolymers, polybutylene and the like; polyimides; polystyrene; polyurethane; polyvinyl chloride; polysulfone; ethylene-vinyl acetate copolymers; acrylonitrile butadiene-styrene; rubber modified acrylonitrile methyl acrylate copolymer; homopolymers and ethylene copolymers of acrylates; vinyl chloride-acetate copolymer; vinylidene chloride-vinyl chloride copolymer; vinyl nitrile rubber alloys; and copolymers and blends thereof, as well as others not particularly noted here. Of these thermoplastic films and film-forming polymers, preferred are polyesters, polyolefins, polyamides and blends thereof. More preferred are polyesters, including polybutylene terephthalate, polyethylene terephthalate and cyclohexanedimethanol-modified polyethylene terephthalate.

The multilayer films of the present invention include as an adhesive layer, also interchangeably referred to in the art as a "tie" layer, between each film layer. In accordance with the present invention, the adhesive layer composition is selected from the group consisting of alkyl ester copolymers, modified polyolefins, and blends thereof.

One group of suitable polymers useful as the adhesive layer includes alkyl ester copolymers of an olefin having from about 2 to about 8 carbon atoms and an alkyl ester of an α,β-ethylenically unsaturated carboxylic acid having the following formula:

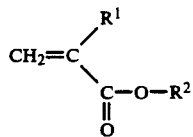

wherein $R^1$ is H or an alkyl group having 1 to 5 carbon atoms, and $R^2$ is H or an alkyl group having 1 to 12 carbon atoms.

Such alkyl ester copolymers can be produced in accordance with the processes well known to the art forming random, block and graft copolymers. Those production processes include, but are not limited to, the ones described in U.S. Pat. Nos. 2,953,551 to White and 3,350,372 to Anspon. As disclosed in U.S. Pat. No. 3,350,372, the alkyl ester copolymers of the present invention can be prepared by a continuous polymerization of an olefin of about 2 to about 8 carbon atoms and an alkyl ester of an α,β-ethylenically unsaturated carboxylic acid in the presence of a free radical polymerization initiator such as lauroyl peroxide or capryl peroxide. The olefins which may be used to form the alkyl ester copolymers include olefins having between 2 and 8 carbon atoms. Non-limiting examples of suitable olefins include ethylene, propylene, butylene, pentene-1,3-methylbutene-1, 4-methylpentene-1, and hexene. Of these, preferred olefins are ethylene, propylene, and butylene; most preferred is ethylene.

The alkyl esters of an α,β-ethylenically unsaturated carboxylic acid which may be used to form the alkyl ester copolymers include, but are not limited to, methyl acrylate, ethyl acrylate, butyl acrylate, 2-ethylhexyl acrylate, decyl acrylate, octadecyl acrylate, methyl methacrylate, ethyl metacrylate, butyl methacrylate, 2-ethylhexyl methacrylate, decyl methacrylate, and octadecyl methacrylate. Of these, preferred are methyl acrylate, ethyl acrylate, butyl acrylate, methyl methacrylate, ethyl methacrylate, and butyl methacrylate; more preferred are methyl acrylate, methyl methacrylate, butyl acrylate, and butyl methacrylate.

Non-limiting examples of the alkyl ester copolymers suitable for use in the present invention include ethylene/methyl acrylate, ethylene/ethyl acrylate, ethylene/butyl acrylate, ethylene/2-ethylhexyl acrylate, ethylene/decyl acrylate, ethylene/octadecyl acrylate, ethylene/methyl methacrylate, ethylene/ethyl methacrylate, ethylene/butyl methacrylate, ethylene/2-ethylhexyl methacrylate, ethylene/decyl methacrylate, ethylene/octadecyl methacrylate, and copolymers and blends thereof. Of these, preferred are ethylene/methyl acrylate, ethylene/ethyl acrylate, ethylene/butyl acrylate, ethylene/methyl methacrylate, ethylene/ethyl methacrylate, ethylene/butyl methacrylate, and copolymers and blends thereof including ethylene/methyl acrylateethylene/butyl acrylate copolymer; more preferred are ethylene/methyl acrylate, ethylene/methyl methacrylate, ethylene/butyl acrylate, ethylene/butyl methacrylate, and copolymers and blends thereof. The preferred alkyl ester copolymer suitable for the present invention comprises between about 5 and about 50 weight % of the alkyl ester, based on the total weight of the alkyl ester copolymer. More preferably, the alkyl ester comprises between about and about 40 weight %; most preferably, between about 10 and about 30 weight %.

The alkyl ester copolymers suitable for the present invention may be further modified to contain up to 5 weight percent, preferably up to 3 weight percent, more preferably up to 1 weight percent, of unsaturated polycarboxylic acids and their anhydrides. Such unsaturated polycarboxylic acids and their anhydrides include maleic acid, maleic anhydride, fumaric acid, crotonic acid, citraconic anhydride, itaconic anhydride and the like. Of these, most preferred is maleic anhydride.

Another group of suitable adhesive polymers includes modified polyolefin compositions having at least one functional moiety selected from the group consisting of unsaturated polycarboxylic acids and acid anhydrides. The polyolefins which may be used to form the modified reaction product of the modified polyolefin compositions suitable for the present invention include polyolefins and their copolymers, wherein the olefin monomers have between about 2 and about 8 carbon atoms. Non-limiting examples of suitable polyolefins include low, medium or high density polyethylene, linear low density polyethylene,polypropylene, polybutylene,polypentene-1, poly-3-methylbutene-1, poly-4-methylpentene-1, polyhexene-1, and copolymers and blends thereof. Of these, preferred polyolefins are polyethylenes, polypropylene, polybutylene, and copolymers and blends thereof.

The modified polyolefin compositions suitable for use in conjunction with the present invention include copolymers and graft copolymers of a polyolefin and a constituent having a functional moiety selected from the group consisting of unsaturated polycarboxylic acids and acid anhydrides thereof. The unsaturated polycarboxylic acids and anhydrides include maleic acid, maleic anhydride, fumaric acid, crotonic acid, citraconic anhydride, itaconic anhydride and the like. Preferred of these are anhydrides, of which most preferred is maleic anhydride.

The preferred modified polyolefin composition comprises between about 0.001 and about 10 weight % of the functional moiety, based on the total weight of the modified polyolefin. More preferably, the functional moiety comprises between about 0.005 and about 5 weight %; most preferably, between about 0.01 and about 2 weight %.

The modified polyolefin compositions suitable for the present invention can be produced in accordance with the processes known to the art, including but not limited to the processes described in U.S. Pat. Nos. 3,481,910; 3,480,580; 4,612,155 and 4,751,270. As a suitable process, a graft polymerization reaction is generally performed by standard graft polymerization techniques known in the art. Such a process comprises heating a mixture of a polyolefin, a monomer of the functional moiety and a free radical initiator under kneading to a temperature at which polyolefin becomes molten to facilitate graft polymerization of the functional moiety. Alternatively, the above-stated compounds are dissolved or suspended in an appropriate solvent to perform the graft polymerization reaction.

The modified polyolefin composition of the present invention preferably further comprises up to about 40 weight %, based on the total weight of the modified polyolefin, of vinyl acetate. More preferably, the modified polyolefin comprises between about 4 and about 30 weight % of vinyl acetate; most preferably, between about 5 and about 25 weight %.

The modified polyolefin compositions suitable for use in the present invention may also contain up to about 40 weight % of at least one thermoplastic elastomer such as ethylene/propylene rubber, ethylene/1-butene rubber, butyl rubber, butadiene rubber, styrene/butadiene rubber, ethylene/butadiene rubber, isopropene rubber, isobutylene or the like. Preferred thermoplastic elastomers are ethylene/propylene rubber and isobutylene rubber. Such thermoplastic elastomers may also be modified with a constituent having a functional moiety selected from the group consisting of unsaturated polycarboxylic acids and acid anhydrides thereof in accordance with the method described above in conjunction with modified polyolefin.

Preferably, the adhesive layer compositions of the present invention are blends of an alkyl ester copolymer and a modified polyolefin. While the present inventors have found that the preferred tie layer compositions are blends of an alkyl ester copolymer and a modified polyolefin, they have also noted that a tie layer comprising 100% alkyl ester copolymer or modified polyolefin also provides a multilayer film construction of the fluoropolymer film and the thermoplastic polymer film which exhibits good interfacial adhesion.

The preferred adhesive layer compositions may vary between a weight ratio of alkyl ester copolymer to modified polyolefin of about 90% to about 0% to a weight ratio of alkyl ester copolymer to modified polyolefin of about 10% to about 100%. More preferably, the ratio of alkyl ester copolymer to modified polyolefin is within the range of about 80%–0% alkyl ester copolymer to about 0%–100% modified polyolefin; most preferably the ratio of alkyl ester copolymer to modified polyolefin is within the range of about 70%–30% alkyl ester copolymer to about 30%–70% modified polyolefin.

Although each layer of the multilayer films structure can be different thickness, the thickness of each of the layers of the films in the multilayer films structure (not including sheet structures) is preferably at least 0.05 mils (1.3 $\mu$m) and preferably up to about 250 mils (6350 $\mu$m). More preferably, the thickness of the multilayer film structures is less than about 50 mils (1270 $\mu$m) thick. The thickness of the tie layer may vary, but is generally in the range of about 0.05 mils to about 12 mils (305 $\mu$m). Preferably the thickness of the tie layer is between about 0.05 mils and about 1.0 mils (25 $\mu$m), most preferably between about 0.25 mils (6 $\mu$m) and 0.8 mils (20 $\mu$m). While such thicknesses are preferred as providing a readily flexible film, it is to be understood that other film thicknesses may be produced to satisfy a particular need and yet fall within the scope of the present invention; such thicknesses which are contemplated include plates, thick films, and sheets which are not readily flexible at room temperature (approx. 20° C.).

The multilayer films of the present invention can have a variety of structures so long as there is an adhesive layer between each polymer layer. A typical film structure includes a three-layer structure, which comprises a thermoplastic polymer layer, an adhesive layer and a fluoropolymer layer. Another typical film structure is a five-layer structure, which comprises a thermoplastic polymer layer, an adhesive layer, a fluoropolymer layer, an adhesive layer and a thermoplastic polymer layer. These are only two of many possible combinations of multilayer film structures, and any variation of the order and thickness of the layers of the fluoropolymer and thermoplastic polymer layer can be made.

It has been surprisingly found that an increase in the thickness of the adhesive layer used between the fluoropolymer film and the thermoplastic film does not necessarily provide an increase in the interfacial adhesion between these said films. Rather, with some combinations of fluoropolymer films and thermoplastic films it may be advantageous to form several similar films with varying thicknesses of the adhesive layer so to determine which adhesive layer thickness provides the best adhesivity between the film layers. Such a determination is within the purview of one skilled in the art and may be readily determined by experimental methods for various combinations of fluoropolymer films and thermoplastic films.

The multilayer films of this invention may be produced by conventional methods useful in producing multilayer films such as by coextrusion techniques and lamination techniques. Coextrusion techniques include methods which include the use of a feed block with a standard die, a multimanifold die such as a circular die for blown bubble film, as well as a multimanifold die such as used in forming multilayer films for forming flat cast films and cast sheets. One particular advantage of coextruded films is in the formation of a multilayer film in one process step by combining molten layers of each of the film layers of fluoropolymer, tie layer composition, and thermoplastic polymer, as well as optionally more film layers, into a unitary film structure.

In order to produce a multilayer film by a coextrusion process, it is necessary that the constituents used to form each of the individual films be compatible in the film extrusion process. What is to be understood by the term "compatible" in this respect is that the film-forming compositions used to form the films have melt properties which are sufficiently similar so to allow coextrusion; melt properties of interest include melting points, melt flow indices, apparent viscosity, as well as melt stability. It is important that such compatibility be present so to assure the production of a multilayer film having good adhesion and relatively uniform thickness across the width of the film being produced. As is known in the art, film-forming compositions which are not sufficiently compatible to be useful in a coextrusion process frequently produce films having poor interfacial lamination, poor physical properties as well as poor appearance. In the practice of the present invention, the above-noted factors which are useful in determining compatibility may be determined, and once polymers having desirable physical properties are selected, experimental trials may be conducted in order to determine the optimal combination of relative properties in adjacent layers. If a coextrusion process is used, it is important that the constituents used to form a multilayer film be compatible within a relatively close temperature range so they may be extruded through a common die. It has been found that the variation of the quantity of the modified polyolefin within the tie layer composition provides an adhesive layer forming composition which is of sufficiently high melt viscosity, especially in the preferred range of compositions described above, to be particularly useful in a coextrusion process with a fluoropolymer film forming composition, and with a PETG film forming composition.

Alternatively, the multilayer films of the present invention can be produced by a lamination technique. Lamination techniques are well known in the art. Such lamination techniques involve forming a multilayer film structure from pre-fabricated film plies. The basic methods used in film laminating techniques are fusion, wet combining, and heat reactivation. Fusion is a method of laminating two or more film plies using heat and pressure without the use of adhesives. This method can only be used where the films being laminated are comprised of polymers that readily form interfacial adhesion. Wet combining and heat reactivation are utilized in laminating incompatible films using adhesive materials. Further details of lamination techniques are disclosed, for example, in the Modern Plastics Encyclopedia, Vol. 57, No. 10A, pp 345-348, McGraw Hill, October 1980.

The multilayer films, whether comprising a three or more layer structure, may optionally be stretched or oriented in any direction if so desired. In such a stretching operation, the film may be stretched in either the direction coincident with the direction of movement of the film being withdrawn from the casting roll, also referred to in the art as the "machine direction", or in a direction which is perpendicular to the machine direction, and referred to in the art as the "transverse direction", or in both the machine direction and the transverse direction. It is to be understood that in the embodiments taught herein that less than all of the films within a multilayer structure which are used to produce such a structure may be oriented, such as might be accomplished by the lamination of an oriented fluoropolymer film to an unoriented thermoplastic film by the use of the adhesive tie layer taught herein, as well as the reverse case, wherein an unoriented fluoropolymer film layer is laminated to an oriented thermoplastic film layer.

The multilayer films taught herein may be subjected to orientation resulting from a stamping or molding process wherein the film is heated and formed into a three dimensional structure; the regions of the film which are formed undergo orientation.

The multilayer films taught in the present invention can be embossed by means known in the art to form packaging structures or containers which require good physical strength as well as low gas and water vapor transmission properties. Typically, embossing can be accomplished using film embossing rolls under heat and pressure.

One particularly useful article are packaging materials associated with medicaments and pharmaceutical compositions which are provided in either pill, caplet or capsule form. Such a packaging structure is known to the art as a "blister" pack. Blister packs conventionally comprise at least two elements, a first sheet of a thermoformed multi-layer film which has been stamped with at least one, but more generally a plurality of indentations which form receptacles. Such indentations extend out of the plane of the film (which may be generally be considered to be two-dimensional) to form a three-dimensional shape. Such shapes form individual receptacles are suited for the retention of the medicaments. A further, second sealant sheet is generally layered in registry with the film sheet which seals the individual receptacles formed within the first sheet and containing the pharmaceutical composition. Typically, the second sealant sheet is a metallic sheet such as aluminum foil or metallized film which provides good strength and low water vapor transmission and/or odor permeability. Further, the use of a metal or metallized sheet as the sealant sheet may be desirable as such materials being substantially opaque provide a backing with the first sheet containing the indentations and a rapid means of visual inspection by which it may be readily determined which of the contents of the receptacles have been removed from the packaging structure. Alternatively, such a second sealant sheet may be a sheet comprised of a fibrous material such as a paper product, or of a polymeric film or sheet which may or may not be colored or which alternately may or may not be opaque.

The films of the present invention may be imparted with a conventional coloring agent or a dye or pigment so to impart a color to the laminated film structures, or alternately to render the film structures substantially opaque. Any conventional coloring agent or a dye or pigment which is appropriate for use in the films may be used.

In addition to packaging and retaining medicaments and pharmaceuticals, blister pack sheets formed from the multilayer film may be used to contain other materials, such as foodstuffs (including liquids or gelatinous materials). Further it should be recognized that the multi-layer film may be thermoformed into a container suitable for foodstuffs, pharmaceutical compositions and other articles of manufacture, such as paints, liquid slurries, and gelatinous compositions.

The invention is more easily understood by reference to specific embodiments which are representative examples according to the teachings of the instant invention. It must be understood however, that the specific embodiments discussed herein are provided only for the purpose of illustration, and not by way of limitation, and it is to be further understood that the invention may be practiced otherwise than specifically described and yet be within the inventive scope.

EXAMPLES

Example 1

A five layer laminate was coextruded using a copolyester resin, a fluoropolymer copolymer resin and a tie layer resin in the structure of polyester/tie layer/fluoropolymer/tie layer/polyester. The polyester used was Kodar® PETG 6763 copolyester, which is cyclohexanedimethanol-modified polyethylene terephthalate, available from Eastman Kodak, and the fluoropolymer was a polychlorotrifluoroethylene (PCTFE) homopolymer with less than 1% vinylidene fluoride content and having about 135 ZST (zero strength time), available from Allied-Signal Inc. under the trademark Aclar®. The ZST value is known to reasonably correlate to the molecular weight of fluoropolymer resins and is determined in accordance with the specifications outlined in ASTM-D1430-81. Admer ™ SF700 was used as the tie layer. Admer ™ SF700 is a maleic anhydride modified polyolefin blended with a thermoplastic elastomer, of density of 0.88 g/cm$^3$ and melt index flow rate of 1.0 g/10 min at 190° C., available from Mitsui Petrochemical Industries, Ltd. An analytical analysis has shown that Admer ™ SF700 is comprised of about 68% ethylene, about 25% propylene, about 7% vinyl acetate and less than 1% maleic anhydride.

After drying the polyester resin for 4 hours at 150° F. (66° C.), it was extruded through a 1½ inch (3.8 cm) diameter Killion single screw extruder (L/D=24/1) equipped with three zones and two adapters. The extruder temperature profile of the extruder was 490° F. (254° C.), 510° F. (266° C.) and 535° F. (266° C.) for zones 1-3, and the two adapters were kept at 535° F. (279° C.). The resulting melt temperature was 526° F. (274° C.).

The fluoropolymer, after drying for 4 hours at 250° F. (121° C.), was extruded through a 1¼ inch (3.2 cm) diameter Killion single screw extruder (L/D=24/1) equipped with three zones and two adapters. The extruder temperature profile of the extruder was 530° F. (277° C.), 540° F. (282° C.) and 550° F. (288° C.) for zones 1-3, and the two adapters were kept at 550° F. (288° C.). The resulting melt temperature was 544° F. (284° C.).

The tie layer was extruded through a 1¼ inch (3.2 cm) diameter Killion single screw extruder (L/D=30/1) equipped with four zones and two adapters. The extruder temperature profile of the extruder was 450° F. (232° C.), 500° F. (260° C.), 535° F. (279° C.) and 545° F. (285° C.) for zones 1-4, and the two adapters were kept at 545° F. (285° C.). The resulting melt temperature was 535° F. (279° C.).

The five layer extrudate was passed through a coextrusion die, which was kept at 550° F. (288° C.). The coextruded film was then cast on a roll at 180° F. (82° C.), followed by a cooling roll at 119.5° F. (48.6° C.). The resulting film had a total thickness of 4.9 mils (124 μm) having the following layers: 1.38 mils (35.1 μm) of PETG, 0.65 mils (16.5 μm) of tie layer, 0.83 mils (21.1 μm) of PCTFE, 0.65 mils (16.5 μm) of tie layer, and 1.38 mils (35.1 μm) of PETG. The adhesion strength between the layers was tested in accordance with the testing procedures outlined in ASTM Test No. D3359-90 Test Method A and ASTM Test No. F88-85. Briefly, ASTM D3359-90 Test Method A is a visual assessment test that utilizes a pressure-sensitive tape to determine the adhesion strength of the test specimen tie-layer. ASTM F88-85 utilizes a tensile testing machine that measures the force required to pull open a seam of flexible barrier materials.

The resulting laminate was not separated when the ASTM D 3359 tape test was applied, and the ASTM F88 test strength was 65.4 g/cm.

Example 2

Example 1 was repeated except the tie layer resin was a mixture of 60% Admer ™ SF700 and 40% EMAC 2260. EMAC 2260 is an ethylene/methyl acrylate copolymer with 24% methyl acrylate content having 2 g/10 min melt flow index at 190° C., available from Chevron Chemical Company.

The extrusion conditions were same as those of Example 1, except the melt temperatures. The polyester melt temperature was 527° F. (275° C.); the fluoropolymer, 547° F. (286° C.); and the tie layer, 534° F. (279° C.).

The resulting five layer extrudate was passed through a coextrusion die, which was kept at 550° F. (288° C.). The coextruded film was then cast on a roll at 180° F. (82° C.), followed by a cooling roll at 119.5° F. (48.6° C.). The resulting film had a total thickness of 8.6 mils (218 μm) having the following layers: 2.8 mils (71 μm) of PETG, 0.8 mils (20 μm) of tie layer, 1.0 mils (25 μm) of PCTFE, 1.0 mils (25 μm) of tie layer, and 3.0 mils (76 μm) of PETG.

The resulting laminate was not separated when the ASTM D-3359 tape test was applied, and the ASTM F88 test strength was 118.1 g/cm.

Example 3

Example 1 was repeated except the tie layer resin was a mixture of 60% Admer ™ SF700 and 40% EMAC 6188-2P. EMAC 6188-2P is a maleic anhydride modified ethylene methyl acrylate copolymer having less than 1 weight % maleic anhydride content, available from Chevron Chemical Company.

The extrusion conditions were same as those of Example 1, except the melt temperatures. The polyester melt temperature was 528° F. (276° C.); the fluoropolymer, 544° F. (284° C.); and the tie layer, 533° F. (278° C.).

The resulting five layer extrudates was passed through a coextrusion die, which was kept at 550° F. (288° C.). The coextruded film was then cast on a roll at 180° F. (82° C.), followed by a cooling roll at 119.5° F. (48.6° C.). The resulting film had a total thickness of 7.7 mils (196 μm) having the following layers: 2.6 mils (66

μm) of PETG, 1.0 mils (25 μm) of tie layer, 0.42 mils (11 μm) of PCTFE, 1.0 mils (25 μm) of tie layer, and 2.7 mils (69 μm) of PETG.

The resulting laminate was not separated when the ASTM D-3359 tape test was applied, and the ASTM F88 test strength was 476.4 g/cm.

Example 4

Example 2 was repeated except the polyester layer used was Selar® PT 8111 amorphous polyethylene terephthalate (PET), available from Du Pont.

The polyester resin was dried for 4 hours at 150° F. (66° C.), and it was extruded through a 1½ inch (3.8 cm) diameter Killion single screw extruder (L/D=24/1) equipped with three zones and two adapters. The extruder temperature profile of the extruder was 500° F. (260° C.), 530° F. (277° C.) and 535° F. (266° C.) for zones 1-3, and the two adapters were kept at 550° F. (288° C.). The resulting melt temperature was 524° F. (273C).

The fluoropolymer, after drying for 4 hours at 250° F. (121° C.), was extruded through a 1¼ inch (3.2 cm) diameter Killion single screw extruder (L/D=24/1) equipped with three zones and two adapters. The extruder temperature profile of the extruder was 525° F. (274° C.), 545° F. (285° C.) and 560° F. (293° C.) for zones 1-3, and the two adapters were kept at 555° F. (291° C.). The resulting melt temperature was 543° F. (284° C.).

The tie layer was extruded through a 1¼ inch (3.2 cm) diameter Killion single screw extruder (L/D=30/1) equipped with four zones and two adapters. The extruder temperature profile of the extruder was 490° F. (254° C.), 515° F. (268° C.), 525° F. (274° C.) and 540° F. (282° C.) for zones 1-4, and the two adapters were kept at 540° F. (282° C.). The resulting melt temperature was 530° F. (277° C.).

The five layer extrudate was passed through a coextrusion die, which was kept at 550° F. (288° C.). The coextruded film was then cast on a roll at 180° F. (82° C.), followed by a cooling roll at 119.5° F. (48.6° C.). The resulting film had a total thickness of 8 mils (203.2 μm) having the following layers: 3.13 mils (79.5 μm) of PET, 0.67 mils (17.0 μm) of tie layer, 0.13 mils (3.3 μm) of PCTFE, 0.76 mils (19.3 μm) of tie layer, and 3.31 mils (84.1 μm) of PET.

The resulting laminate was not separated when the ASTM D-3359 tape test was applied.

The five layer laminates from Example 1 and Example 2 were tested for the oxygen transmission rate in accordance with the testing procedures outlined in ASTM Test No. D3985-81 with an Oxtran 1050 gas transmission testing equipment, manufactured by Mocon/Modern Controls, Inc., at 73° F. (23° C.) and 1 atm oxygen pressure. A 5 mil (127 μm) polyethylene terephthalate film (Mylar®, available from Du Pont) was used as a comparative example (Comparative 1). The oxygen gas transmission rate was determined after the samples had equilibrated in the dry-test environment, which is less than 1 % relative humidity. Each specimen was mounted as a sealed semi-barrier between one chamber containing oxygen and one chamber containing nitrogen, and the oxygen transmission rate was measured from the nitrogen chamber. The results are shown in Table 1 below.

TABLE 1

| Sample | $O_2$ Transmission Rate |
|---|---|
| Example 1 | 2.93 cc/100 in$^2$/day/atm (97.6 × 10$^{-6}$ mol/(m$^2$-s)/atm) |
| Example 2 | 2.43 cc/100 in$^2$/day/atm (81.0 × 10$^{-6}$ mol/(m$^2$-s)/atm) |
| Comparative 1 | 3.56 cc/100 in$^2$/day/atm (118.6 × 10$^{-6}$ mol/(m$^2$-s)/atm) |

The above results show that the multilayer of the present invention provides superior oxygen barrier properties over the polyethylene terephthalate film of similar thickness.

The five layer laminates from Example 1 and Example 2 were tested for the water vapor transmission rate in accordance with the testing procedures outlined in ASTM Test No. F372-73 with an Oxtran 1050 gas transmission testing equipment, manufactured by Mocon/Modern Controls, Inc., at 73° F. (23° C.) and ambient atmospheric pressure. Each specimen was mounted as a sealed semi-barrier between a wet chamber of 97% relative humidity and a dry chamber, and the water vapor transmission rate was measured from the dry chamber. The results are shown in Table 2. Included in Table 2 is the published water vapor transmission rate of a 10 mil (254 μm) Kodar PETG copolyester 6763 film from the data published by Eastman Chemical as a comparative example (Comparative 2).

TABLE 2

| Sample | Water Vapor Transmission Rate |
|---|---|
| Example 1 | 0.044 g/100 in$^2$/day (0.00284 g/m$^2$/day) |
| Example 2 | 0.043 g/100 in$^2$/day (0.00277 g/m$^2$/day) |
| Comparative 2 | 93 g/100 in$^2$/day (6 g/m$^2$/day) |

The above results show that the multilayer films of the present invention provides substantially improved water vapor barrier properties over the polyethylene terephthalate copolymer film.

As can be seen from the above examples, the multilayer films of the present invention provide a strongly adhered film construction that exhibit superior oxygen and water vapor barrier properties.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A multilayer film comprising:
   a) at least one fluoropolymer layer;
   b) at least one polyester layer, said polyester layer is adjacent to said fluoropolymer layer; and
   c) at least one adhesive layer selected from the group consisting of alkyl ester copolymers of an olefin having about 2 to about 8 carbon atoms and an α,β-ethylenically unsaturated carboxylic acid, modified polyoloefins comprising an olefin of about 2 to about 8 carbon atoms and a functional moiety selected from the group consisting of unsaturated carboxylic acids and acid anhydrides, and blends of said alkyl ester copolymers and said modified polyolefins, wherein said adhesive layer composition is interposed between each polymer layer.

2. The multilayer film according to claim 1 wherein said at least one fluorpolymer layer is selected from the group consisting of homopolymers and copolymers of polychlorotrifluoroethylene and ethylenechlorotrifluoroethylene copolymers, and blends thereof.

3. The multilayer film according to claim 1 wherein said fluoropolymer layer is a polychlorotrifluoroethylene layer.

4. The multilayer film according to claim 1 wherein said fluoropolymer layer is an ethylenechlorotrifluoroethylene copolymer layer.

5. The multilayer film according to claim 1 wherein said polyester layer is a polyethylene terephthalate layer.

6. The multilayer film according to claim 1 wherein said polyester layer is a PETG copolyester layer.

7. The multilayer film according to claim 1 wherein said modified polyolefin comprises about 0.001 to about 10 weight percent, based on the total weight of said modified polyolefin, of at least one functional moiety selected from the group consisting of maleic acid, maleic anhydride, fumaric acid, crotonic acid, citraconic anhydride, and itaconic anhydride.

8. The multilayer film according to claim 1 wherein said modified polyolefin comprises, based on the total weight of said modified polyolefin, about 90 to about 99.99 weight percent of polyethylene and about 10 to about 0.001 weight percent of maleic anhydride.

9. The multilayer film according to claim 1 wherein said modified polyolefin comprises, based on the total weight of said modified polyolefin, about 0.001 to about 10 weight percent of maleic anhydride, up to about 40 weight percent of vinyl acetate, up to about 40 weight percent of ethylene/propylene rubber and the balance being polyethylene.

10. The multilayer film according to claim 1 wherein said alkyl ester copolymer comprises, based on the total weight of said alkyl ester copolymer, about 50 weight percent to about 95 weight percent of an olefin and about 50 weight percent to about 5 weight percent of at least one $\alpha,\beta$-ethylenically unsaturated carboxylic acid.

11. The multilayer film according to claim 10 wherein said alkyl ester copolymer is selected from the group consisting of ethylene/methyl acrylate, ethylene/ethyl acrylate, ethylene/methyl methacrylate, ethylene/ethyl methacrylate, ethylene/butyl acrylate, ethylene/butyl methacrylate, and copolymers and blends thereof.

12. The multilayer film according to claim 11 wherein said alkyl ester copolymer further comprises up to 1 weight percent of maleic anhydride.

13. The multilayer film according to claim 1 wherein said alkyl ester copolymer is ethylene/methyl acrylate.

14. The multilayer film according to claim 1 wherein said alkyl ester copolymer is a maleic anhydride modified ethylene/methyl acrylate.

15. An article formed from said multilayer film according to claim 1.

16. A multilayer film comprising:
 a) at least one fluoropolymer layer selected from the group consisting of homopolymers and copolymers of polychlorotrifluoroethylene;
 b) at least one polyester layer, said polyester layer is adjacent to said fluoropolymer layer; and
 c) at least one adhesive layer selected from the group consisting of alkyl ester copolymers of an olefin having about 2 to about 8 carbon atoms and an $\alpha,\beta$-ethylenically unsaturated carboxylic acid, modified polyolefins comprising an olefin of about 2 to about 8 carbon atoms and a function moiety selected from the group consisting of unsaturated carboxylic acids and acid anhydrides, and blends of said alkyl ester copolymers and said modified polyolefins, wherein said adhesive layer composition is interposed between each polymer layer.

17. An article formed from said multilayer film according to claim 16.

* * * * *